United States Patent [19]

Recker

[11] Patent Number: 4,809,714

[45] Date of Patent: Mar. 7, 1989

[54] ATTACHMENT FOR CORN HUSKING ROLLS

[76] Inventor: Larry E. Recker, R.R. 2, Box 198, Arlington, Iowa 50606

[21] Appl. No.: 892,272

[22] Filed: Aug. 4, 1986

[51] Int. Cl.$^4$ ............................................. A01F 11/00
[52] U.S. Cl. ...................................... 130/5 G; 56/104
[58] Field of Search .................. 130/5 G; 56/104, 105

[56] References Cited

U.S. PATENT DOCUMENTS

| 2,080,717 | 5/1937 | Hitchcock | 130/5 G |
| 2,239,899 | 4/1941 | Nightenhelser et al. | 130/5 G |
| 2,546,264 | 3/1951 | Jones | 130/5 G |
| 2,571,865 | 10/1951 | Greedy et al. | 56/103 |
| 2,771,731 | 11/1956 | Heth et al. | 56/104 |
| 4,340,070 | 7/1982 | Keitel | 130/5 G |

Primary Examiner—Paul J. Hirsch
Attorney, Agent, or Firm—Zarley, McKee, Thomte, Voorhees & Sease

[57] ABSTRACT

An attachment for corn husking beds which have a plurality of rolls that remove the husks from picked ears of corn. Normally, the ears lay flat on the rolls and the ears are moved by flexible fingers over the bed. Not infrequently, an ear will jam between the rolls and protrude upright from the bed causing a jam at the discharge end of the bed. The attachment of the invention is mounted near the discharge end of the husking bed to loosen the jammed ears. The attachment includes auger segments positioned at the proper height so as to loosen jammed ears without damaging the ears that are in the normal position and moving properly along the bed.

4 Claims, 1 Drawing Sheet

ATTACHMENT FOR CORN HUSKING ROLLS

BACKGROUND OF THE INVENTION

The invention relates to corn pickers which have a husking bed consisting of a series of rolls that remove the husks from the freshly picked corn. The invention also relates to stationary installations of seed corn plants where the picked ears of corn are received and passed through a husking roll bed in order to remove husks from ears that may have passed through the corn picker without having the husks removed.

Husking roll beds are common and include a bed of rolls, usually four in number, with each pair of rolls being rotated in a direction with respect to its companion roll to move anything downwardly between the rolls. Also, one of each pair of rolls is power driven and covered with a friction material, such as rubber, while the other roll is normally uncovered. The function of these rolls is to aid in removing the husks in combination with rotating flexible fingers positioned above the husking bed. Rolls also move the ears from the entrance end to the discharge end of the husking bed.

Normally, the ears travel down the husking bed on the rolls without difficulty, the ears lying flat between the rolls. However, occasionally, the shank of an ear will get caught between the rolls and the ear will travel down the husking bed in an upright position. When this occurs, because of the structure of the discharge end of the husking bed, an ear jammed in this manner will not be discharged from the bed. Obviously, a jammed ear will cause the ears behind it to back up creating a jam in the husking bed. The only way presently to effectively remove the jam is to manually loosen the jammed ear or ears while the machine is running. Obviously, this is dangerous and has resulted in many injuries to operators of corn pickers.

The prior art shows attempts to minimize the jamming problem by more evenly distributing the ears over the husking bed. For example, Bond U.S. Pat. No. 2,619,967 shows a feeding mechanism consisting of a plurality of rotating metal blades extending tranversely over and across the husking rolls. The purpose of these rotating blades is to assure even distribution of the ears over the husking bed at the entrance end of the husking bed thereby eliminating piling of the ears along one side of the bed. Similarly, Bulfer U.S. Pat. No. 2,700,858 discloses a means for agitating and moving ears at the entrance end of the husking bed forcing them downwardly for proper engagement with the husking rolls. However, in spite of these distribution means attempting to correct the problem at the entrance end of the husking bed, ears will still occasionally jam between the husking rolls, move to an upright position and jam the husking bed at its discharge end.

There is therefore a need for an effective and inexpensive means for eliminating the jams that occur along the husking bed by loosening the jammed ears at the discharge end of the husking bed. There is a need for an improvement which will correct this jamming in an effective manner without damaging the ears properly positioned on the husking bed and so as to eliminate any necessity for manually attempting to loosen jammed ears thus eliminating the hazard results from the operator using his or her hands to eliminate the jam.

SUMMARY OF THE INVENTION

The attachment of the invention consists of a shaft running transversely to the axes of rotation of the rolls in the husking bed, the shaft driving through a gear box segments of augers, one for each set of husking rolls, which auger segments are driven about axes parallel to the axes of the rolls of the husking bed. The leading edge of each of the auger segments is a straight surface, and the augers are positioned above the husking bed so as to clear ears properly positioned on the husking bed. Augers are continuously rotated during operation of the husking bed, and in the event an ear of corn becomes jammed in between two of the husking rolls, it will be forced by the positive action of the auger off the discharge end of the bed.

DESCRIPTION OF THE PREFERRED EMBODIMENT OF THE INVENTION

Figure 1:
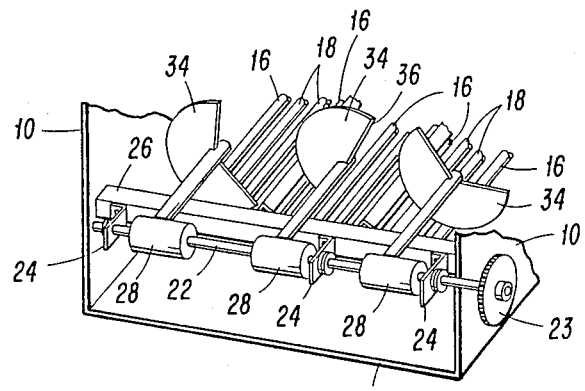
FIG. 1 is a perspective view of the discharge end of an auger bed showing the attachment of the invention in place.
Figure 2:
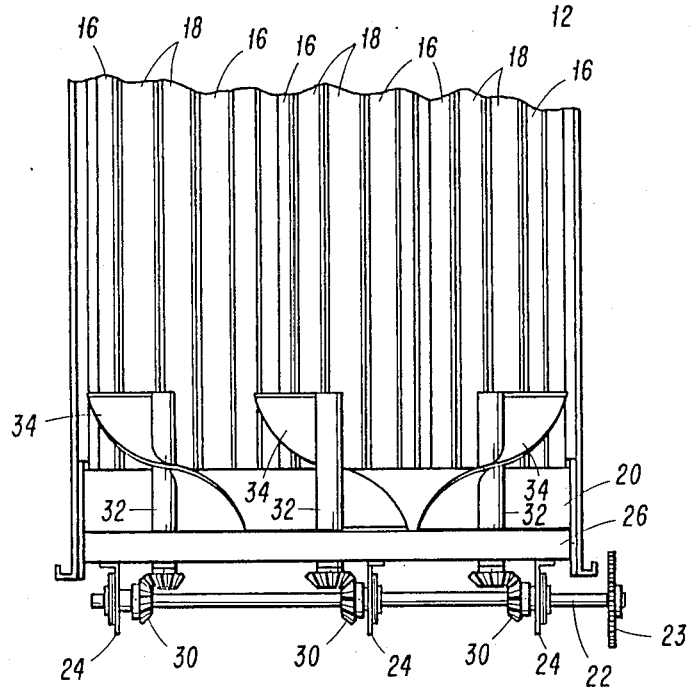
FIG. 2 is a top plan view of the discharge end of a husking bed showing the attachment of the invention.
Figure 3:
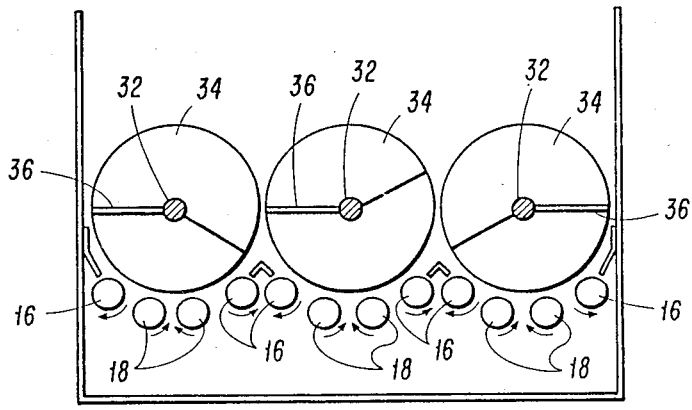
FIG. 3 is an end elevational view illustrating the relative position of the auger segments of the invention and the rolls of the husking bed.

The drawings illustrate a twelve roll husking bed which is a common part of most commercially used corn pickers. A husking bed is contained within an enclosure that includes side walls 10 and a bottom wall 12. So, normally, most of the husking bed would be covered by a top wall (not shown). Within the enclosure formed by side walls 10 and bottom wall 12, there are a plurality of sets of husking bed rollers, each indicated by the reference numeral 14. As best illustrated in FIG. 3, the husking bed rollers 14 are in multiples of four rolls each the outer rolls 16 being positioned at the same level and at a level above the inner rolls 18. Also, as is well known, the outer roll 16 is preferably uncovered with a friction material such as rubber while the inner rolls are covered steel rolls which contain spiral flights (not shown) that will move the ears of corn from the entrance end of the husking bed to the discharge end. FIG. 3 also illustrates the preferred direction of rotation of the husking rolls 16 and 18, adjacent rolls being rotated in opposite directions. It will also be noted that each adjacent pair of rolls 14 in a set are rotated in the directions so that the ear of corn riding between a roll 16 and 18 will tend to be pulled downwardly. Also, all of the rolls 16 and 18 are power driven in a manner that is well known to those skilled in the art. The outer ends of the rolls 16 and 18 which are at the discharge end of the husking bed contain bearings (not shown) which are commonly covered by a cover plate 20 (FIG. 2). This cover plate 20 normally presents no problem in discharging the ears properly positioned in the flat or horizontal position on the husking rolls.

To aid in moving the ears along the husking bed and to aid in removing the husks, there are commonly provided above the husking bed a plurality of rotating flexible fingers (not shown), as is well known to those skilled in the art.

As previously indicated, ears of corn that are properly positioned on the husking rolls are carried along in a flat or horizontal position and the husks removed by action of the rotating rolls 16 and 18 and the flexible fingers. However, even if the ears of corn are relatively evenly distributed across the husking bed, an occasional ear will have its shank or tip wedged in between a pair of husking rolls, and by the time the ear reaches the discharge end of the husking bed, the ear will be partially upright and will catch on the cover plate 20 which will prevent it from being discharged from the husking bed. Ears of corn in their normal positions lying flat on the husking rolls will be carried easily over the cover plate 20. However, when an ear of corn becomes jammed between a pair of husking rolls and is not discharged from the husking bed, the ears following the jammed ear will back up on the husking bed and create a jam with ears caught in the jam not having their husks properly removed. If the jam is not removed, numerous ears can be discharged from the husking bed without having their husks removed, or the entire husking bed will become jammed. In any event, there is no known effective way of correcting the jam except by action of the operator manually removing the jammed ear or ears from the discharge end of the husking bed. This obviously is quite dangerous.

The attachment of the invention consists of a drive shaft 22 positioned just beyond the discharge end of the husking bed. Shaft 22 runs transversely to the axes of rotation of the husking rolls 14. Preferably, the drive shaft 22 is driven by a drive gear 23 at an outer end, which drive gear 23 would be connected by a chain to the existing drive system (not shown) of the standard husking bed.

The drive shaft 22 is supported by suitable supports 24 secured to a cross member 26. Near each support 24 is a gear box 28 which contains a pair of bevel gears 30 (FIG. 2), which gears 30 drive shafts 32 about axes parallel to the axes of rotation of the husking bed rollers 14. At the outer end of each shaft 32 is a segment of an auger flight, which is indicated generally by the reference numeral 34. Segment 34 is of a size slightly greater than half of the auger flight, and the leading edge 36 is preferably along a radial line and is straight. Also, the leading edge 36 may be formed with a blunt or rounded edge so as not to damage an ear of corn that it strikes. This can be accomplished by welding along the leading edge 36 small metal rods.

As best seen in FIG. 3, the arc of rotation of the outermost point of the auger segments 34 is just slightly above the level of the roller bed. Preferably, the distance above the roller bed of the arc of rotation of the auger segments 34 is sufficient to allow a properly positioned ear of corn to pass between the rotating auger segments. Also, as shown in the drawings, there is one auger segment 34 for each set of four rolls.

In operation, auger segments 34 will be rotated at all times that the husking bed rollers 14 are rotating. If a properly positioned ear of corn is traveling down the husking bed, it will usually pass between rotating auger segments 34. However, if a rotating auger segment 34 does strike an ear, it will merely push it out of the way because of the blunt leading edge 36. The blunt leading edge is important in that it prevents the auger from climbing over a properly positioned ear and perhaps damaging the ear. However, if an improperly positioned ear is traveling down the husking bed and would potentially cause a jam, the curved surface 36 of a rotating auger segment 34 contacts the ear at a point just above the bed, forcing the ear out of contact with the husking rollers and knocking it down to a proper or horizontal position. Thus, using the curved flight of an auger, the improperly positioned ear will be forced down and forwardly so that the ear will be properly positioned upon discharge from the bed.

The attachment of the invention is designed for all husking bed rollers, whether associated with a corn picker or whether mounted at the receiving dock of a plant. The invention is especially applicable to seed corn, which has a slightly larger shank because of the way it grows. By addition of the attachment of the invention to a husking roller bed, jams are virtually eliminated. This not only saves production time, but eliminates the extreme hazard of attempting to manually remove jams. By eliminating jams, the life of the husking rollers is lengthened, thus decreasing maintenance costs of equipment which utilizes husking bed rollers. Obviously, the invention is applicable to any size husking bed whether it be a twelve roll, sixteen roll or twenty four roll stationary bed. As previously indicated, one auger segment is added for each set of the four rolls.

Having thus described the invention in connection with a preferred embodiment thereof, it will be evident to those skilled in the art that various revisions and modifications can be made to the preferred embodiment described herein without departing from the spirit and scope of the invention. It is my intention however that all such revisions and modifications that are obvious to those skilled in the art will be included within the scope of the following claims.

What is claimed is:

1. An attachment for a corn husking bed having an entrance end and a discharge end and having a plurality of husking rolls extending between the entrance end and discharge end and rotatable about parallel axes to remove husks from ears of corn as they travel from the entrance end to the discharge end of the husking bed, said attachment comprising, a drive shaft rotatable about an axis parallel to the axes of rotation of the husking rolls, a segment of an auger flight secured to the drive shaft and rotatable therewith, said segment being of a hard inflexible material, the auger flight segment and drive shaft being positioned at the discharge end of the husking bed and above the husking rolls a sufficient amount so that the arc of rotation of the auger flight segment is just slightly above the husking rolls at a distance from the husking rolls substantially less than the thickness of an ear of corn, said auger flight being positioned only at the discharge end of said corn husking bed and extending a distance substantially less than one-third the length of the husking rolls to lay down any vertically standing ears of corn but not disrupt removal of husks from said ears by said husking rolls, and power means for driving the drive shaft and auger flight segment whenever the husking rolls are rotating.

2. The attachment of claim 1 in which the leading edge of the auger flight segment is along a radial line and is a straight blunt edge.

3. The attachment of claim 1 in which there is one auger flight segment for each set of four husking rolls.

4. The attachment of claim 3 in which the power means includes a shaft extending transversely of the husking rolls, said power shaft being operatively connected to each drive shaft.

* * * * *